United States Patent
Marte et al.

[11] Patent Number: 6,139,755
[45] Date of Patent: Oct. 31, 2000

[54] OXIDATION METHOD, NOZZLE SYSTEM AND SEWAGE TREATMENT PLANT

[76] Inventors: Walter Marte, Barenfelsstrasse 3, Ulisbach CH-9631; Martin Meyer, Sonnhaldenstrasse 2, Zurich CH-8032; Ulrich Meyer, Kurvenstrasse 36, Zurich CH-8006, all of Switzerland

[21] Appl. No.: 09/242,274

[22] PCT Filed: Jun. 10, 1998

[86] PCT No.: PCT/CH98/00250

§ 371 Date: Mar. 23, 1999

§ 102(e) Date: Mar. 23, 1999

[87] PCT Pub. No.: WO98/57895

PCT Pub. Date: Dec. 23, 1998

[30] Foreign Application Priority Data

Jun. 14, 1997 [CH] Switzerland .............. 1443/97

[51] Int. Cl.[7] ...................................... C02F 1/72
[52] U.S. Cl. .................... 210/752; 210/759; 210/762; 210/765; 210/766; 210/181; 210/195.1; 210/205; 210/221.2; 261/77; 261/121.1; 261/DIG. 39; 261/DIG. 75; 422/226; 422/235
[58] Field of Search ...................... 210/752, 758, 210/759, 761–763, 765, 766, 181, 195.1, 205, 220, 221.1, 221.2; 261/76, 77, 121.1, DIG. 39, DIG. 75; 422/184.1, 226–228, 235

[56] References Cited

U.S. PATENT DOCUMENTS

| | | | |
|---|---|---|---|
| 2,669,440 | 2/1954 | Lindenbergh | 210/221.2 |
| 3,938,738 | 2/1976 | Nagel et al. | 239/9 |
| 4,012,468 | 3/1977 | Kikuchi | 261/78 R |
| 4,072,613 | 2/1978 | Alig | 210/198.1 |
| 4,162,970 | 7/1979 | Zlokarnik | 261/DIG. 75 |

(List continued on next page.)

FOREIGN PATENT DOCUMENTS

| | | |
|---|---|---|
| 379 204 | 7/1990 | European Pat. Off. |
| 43 14 521 | 11/1994 | Germany |
| 44 46 375 | 4/1996 | Germany |

OTHER PUBLICATIONS

N.M. Emanuel, et al.; "Catalytic effect of transition–metal compounds in the liquid–phase oxidation of hydrocarbons"; *Angew. Chem.;* 1969; vol. 81, pp. 91–101. (English Abstract).

H.R.Klay; "Components for Wet Oxidation Plants"; *Sulzer Technical Review*; 1988 vol. 4, pp. 41–43.

K.Holzer; "Treatment of problematic waste water"; *Umwelt*; 1991; pp. 179–181. (English Abstract).

(List continued on next page.)

*Primary Examiner*—Peter A. Hruskoci
*Attorney, Agent, or Firm*—Merchant & Gould P.C.

[57] ABSTRACT

The invention relates to a method for oxidizing substances contained in sewage, a nozzle system, and a plant for carrying out this method. The method is characterized in that three radical chain circuits are superimposed, thus producing a continuous reaction chain which is maintained by incorporating a radical starter, a catalyst and oxygen into the sewage flow. The reaction is characterized in that the reaction partners are brought together via a nozzle system which creates unsteady flowing conditions. To reduce operational costs, the sewage is fed by the nozzle system to the autothermic reactor via a heat exchanger which is heated by the treated sewage flow. The method is characterized by its flexibility in treating different kinds of sewage flow of different concentrations. The advantages are, above all, the following: reduced sludge production, high biocompatibility of the residues to be transported, and low consumption of chemical substances. These advantages, combined with the autothermic nature of the reaction and the high degree of efficiency, result in an economic procedure for waste disposal.

28 Claims, 5 Drawing Sheets

U.S. PATENT DOCUMENTS

| | | | |
|---|---|---|---|
| 4,234,426 | 11/1980 | Wilhelmi et al. | 210/149 |
| 4,308,138 | 12/1981 | Woltman | 210/220 |
| 4,487,553 | 12/1984 | Nagata | 417/171 |
| 4,690,764 | 9/1987 | Okumura et al. | 210/629 |
| 5,120,442 | 6/1992 | Kull et al. | 210/621 |
| 5,240,598 | 8/1993 | Portier et al. | 210/151 |
| 5,494,585 | 2/1996 | Cox | 210/748 |
| 5,505,856 | 4/1996 | Campen et al. | 210/668 |
| 5,558,783 | 9/1996 | McGuinness | 210/761 |

OTHER PUBLICATIONS

F. Haber, et al.; "The Catalytic Decomposition of Hydrogen Peroxide by Iron Salts"; *Proc. Roy. Soc.* (*London*); 1934; pp. 332–351.

U.Sewekow; "Treatment of waste water arising from reactiv dyes with hydrogen peroxide and ferrous sulphate"; *Melliand Textilberichte*; 1993; pp. 153–157. (English Abstract).

W. Feuerstein, et al.; "Model experiments for the oxidation of aromatic compounds by hydrogen peroxide in waste water treatment"; *Vom Wasser*; 1981; pp. 35–54. (English Summary).

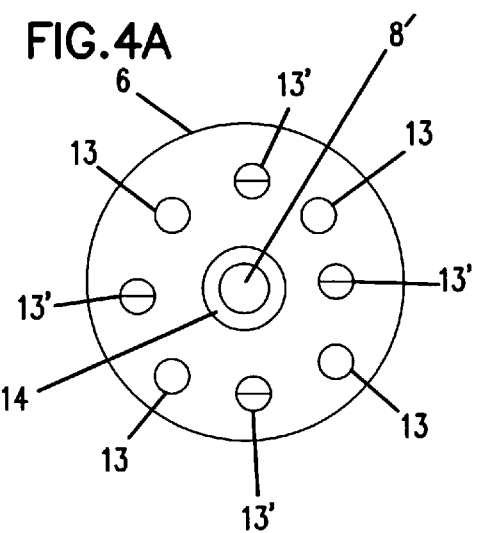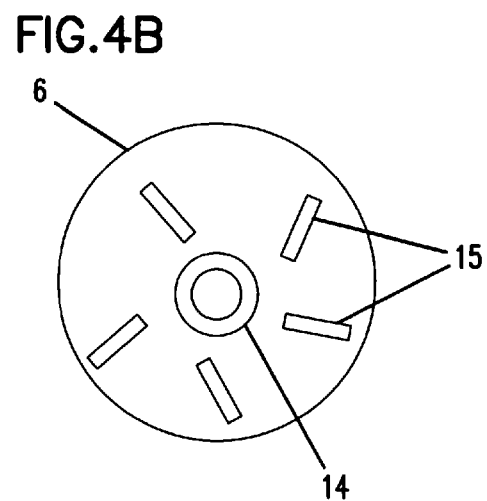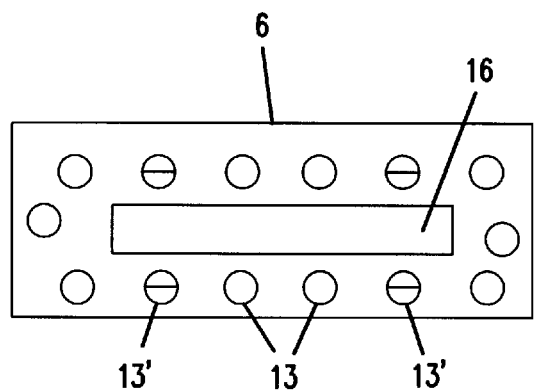

OXIDATION METHOD, NOZZLE SYSTEM AND SEWAGE TREATMENT PLANT

TECHNICAL FIELD

The invention relates to a process for the continuous operation of a system for the treatment of organically contaminated waste water in a reactor with an upstream heat exchanger and with at least one nozzle system, as well as to a system for conducting the process. The invention also relates to a nozzle system having a motive jet nozzle in which a channel is provided for the waste water and having nozzles for the infeed of additional reaction partners.

BACKGROUND

The house-internal waste-water disposal systems for non biocompatible organic wastes installed today usually operate according to one of the various precipitation principles (electroflotation, flocculation with sedimentation or flotation, etc.), in the course of which in all processes undesired sludge is produced as a consequential problem. Sludge disposal is increasingly posing great difficulties because mere removal to landfills has become scarcely possible, the only available alternative then being sludge incineration. In addition, all flocculation/precipitation processes can achieve only a more or less partial decontamination of the waste water, depending on the contamination substances, which is however at the price of a very high use of chemicals which produce a very lot of sludge.

In the disposal of organic waste materials of highly contaminated component flows, today sludge-free processes such as autoxidation processes (N. M. Emanuel, Z. K. Maizus, I. P. Skibida, Angew. Chem 81, 91–101 (1969)) are therefore taking on increasing significance. Such processes are known in the chemical industry for the purpose of synthesis, but also of disposal of special refuse. Major industrial applications in disposal techniques are found in high-temperature wet incineration which are carried out at 180–280° C. with pure oxygen (H. R. Klay, Sulzer Technical Review 4, 41–43 (1988)), such as e.g. according to the Krupp-KATOX process. A further autoxidation process performed with oxygen, which is referred to as a low-pressure process, is the Bayer "LOPROX" process (K. Holzer, Umwelt, vol. 21, 179–181 (1991)), which operates at a temperature of below 200° C. and at operating pressures of 5–20 bar.

More recent processes on the wet incineration of organic substances operate predominately at below 100° C. with hydrogen peroxide and ferrous salt, this system being known as "Fentons seagents" (F. Haber, J. Weiss, Proc. Roy. Soc. (London) A 147,332–351 (1934); U. Sewekow, Melliand Textilberichte 1993, 153–157). To date, the processes based on pure "Fentons Reagents" have not gained industrial significance because the process costs are much too high. In this case the hydrogen peroxide is the sole reagent which is used for the oxidation of the substances to be disposed.

In the disclosure publication DE-A1-4314521 a process based on the Fentons reagent (FENTOX process) is described which is provided for the cleaning of organically contaminated industrial waste water. Here, if necessary at least a second reactor is used for the reaction process, which requires a high effort.

In the work of W. Feuerstein et al. (Vom Wasser 56, 35–54 (1981)) combinations of hydrogen peroxide and air oxygen for the oxidation of organic waste water contaminants are described in which the oxygen infused into the reaction mixture substantially accelerates the degradation.

Substantial disadvantages of known autoxidation processes for the disposal of organic waste water impurities are the high temperatures, the problems of reactor materials—due to the operating temperature and the reactor principle—as well as the operating costs.

SUMMARY OF THE INVENTION

The objective of the present invention is to propose an oxidation process for the treatment of organically contaminated waste water in a reactor with a nozzle system with the infusion of a radical starter, a catalyst and a $O_2$-containing gas under unstationary flow conditions. A further objective of the invention is to propose a nozzle system and a system for the purpose of carrying out the process.

The invention involves a process for the continuous operation of a system for the treatment of organically contaminated waste water in a reactor with an upstream heat exchanger and with at least one nozzle system by the addition of a radical starter, a catalyst and an $O_2$-containing gas. The waste water is pre-temperized in a heat exchanger and then is fed into the reactor with at least one nozzle system having with a motive jet nozzle. The radical starter and the catalyst are added to the motive jet along with the $O_2$-containing gas, thereby producing an unstationary flow, with a subsequent reaction chain starting, wherein in this reaction chain a superimposition of the radical chain reaction initiated by the radical starter and of the $O_2$ chain reaction initiated by the $O_2$-containing gas occurs, as a result of which the catalyst cyclically changes its valance and wherein the degradation of the waste water impurities to be oxidized is thereby effected.

The invention also involves a system for performing the aforedescribed process. The system includes a reactor with an upstream heat exchanger with inlets and outlets for the waste water, a supply of heat and an air exhaust line, with apportioning sections for a radical starter, a catalyst, acid or alkaline and an $O_2$-containing gas. The system also has a nozzle system, wherein in the lower part of the reactor at least one nozzle system connected with the waste water supply system and a pipe is provided which connects the waste water inlet via a valve $RV_8$ with the upper part of the reactor and which is provided for the addition of the substances for the initiation and stabilization of a microdispersion.

The invention is also found in a nozzle system that has a motive jet nozzle in which a channel is provided for the waste water and nozzles for the infeed of additional reaction partners are arranged in the underpressure area of the motive jet nozzle.

DESCRIPTION OF THE FIGURES

The process, the attendant system and the nozzle system are described below. Shown are:

FIG. 4A–4C Plan view of further examples of embodiments of a motive jet nozzle with various nozzle heads FIG. 5 Longitudinal cross section through reaction nozzle FIG. 6 Isometric (cutaway) view of nozzle system with slot-shaped nozzles.

DETAILED DESCRIPTION

The process according to the present invention and the associated reactor internals, in particular the nozzle system, permit an operating regime which is not beset by the aforementioned disadvantages.

Figure 1:
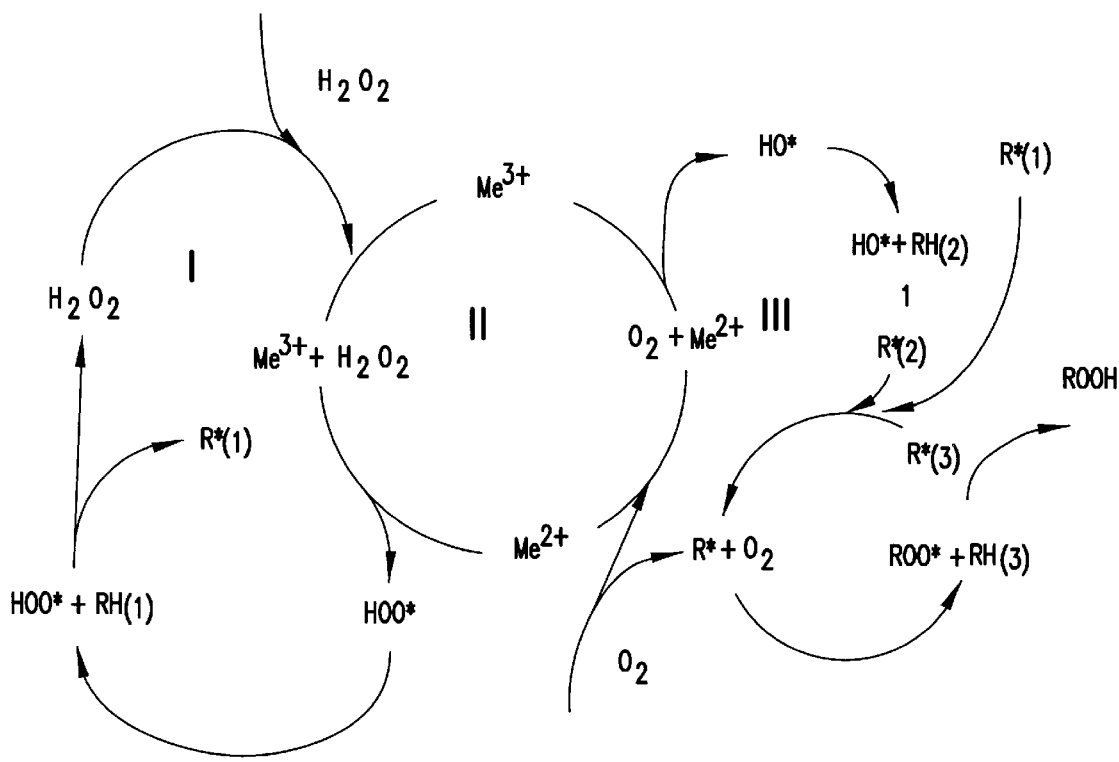
FIG. 1 Schematic representation of radical chain reactions

FIG. 1 shows a schematic representation of the radical chain reactions on which the process is based.

The autoxidation of the organic waste water contaminants is initiated by a radical starter, or by a radical-forming oxidant. As such, compounds from the group of azo compounds such as azobisisobutyronitrile (AIBN) and azobis (cyclohexanecarbonitrile) or compounds from the group of peroxide compounds such as benzoylperoxide, di-tert-butylperoxide and hydrogen peroxide, preferably hydrogen peroxide, can be used. In FIG. 1 hydrogen peroxide is used in lieu of a radical starter or a radical-forming oxidant. The radical chain reaction I starts by the reaction of the peroxide with the higher-valence catalyst ion in that it is transposed into a lower oxidation level with the formation of a hydroperoxide radical HOO*. The hydroperoxide radical subsequently reacts with the substrate RH(1) or with the substances contained in the waste water, thereby releasing peroxide and a carbon radical R*(1). Both species are recycled back into the circuit (I or III).

As a catalyst salts of the transition metals such as those of iron, manganese, copper, chrome and many others, and preferable ferrous sulfates, can be used.

Catalyst reaction 11 corresponds to a reaction cycle, in the course of which the higher-valence catalyst ion is transposed by the peroxide into the lower-valance ion, and the lower-valence ion by the infused oxygen back into the higher-valence ion.

Oxygen chain reaction III starts with the infeed of a $O_2$-containing gas into the reaction mixture. The oxygen reacts on the one hand with the lowervalence catalyst ion, thereby producing a hydroxiradical HO which with the substrate RH(2) forms a carbon radical R*(2), and on the other hand with the carbon radicals R* present in the reaction mixture to form peroxide radical ROO*. In a subsequent reaction with the substrate RH(3) the product ROOH is formed, and further carbon radicals R*(3) are released. As the $O_2$-containing gas air, oxygen/air mixtures and pure oxygen, but preferably air, can be used.

Considered in isolation the radical chain reaction I and the catalyst reaction II form the known Fenton circuit in the event that hydrogen peroxide is used as a radical starter and a ferrous salt as the catalyst.

According to the present invention an oxygen chain reaction III is superimposed on radical chain reaction I and on catalyst reaction II, thereby producing a combination of "just-in-time" chain reactions or a reaction chain in which the $O_2$-containing gas assumes the function of the principal oxidant. The reaction chain is maintained by the interaction of circuits I, II and III in the manner described. The use of predominantly air as a source of oxygen has proven to be of advantage, yielding substantial cost reductions in conjunction with the consumption of overall much smaller amounts of chemical. In this context particular care must be taken that the ratio of radical starter to oxygen of the $O_2$-containing gas or the hydrogen peroxide/oxygen ratio, and that a specific catalyst activity are correct. Typical ratios of the substrate fractions or waste water impurities oxidized by hydrogen peroxide and oxygen are 1:0.5 to 1:5. This means that up to five times the amount of the hydrogen peroxide fraction can be oxidized by the infused oxygen.

Such high oxygen transfer efficiencies are rendered possible only by the process and the nozzle system as set forth in the present invention. On correct matching of the participating reaction partners the process offers another advantage in the possibility of degrading impurity concentrations autothermally, thereby affording very cost-effective disposal.

Figure 2:
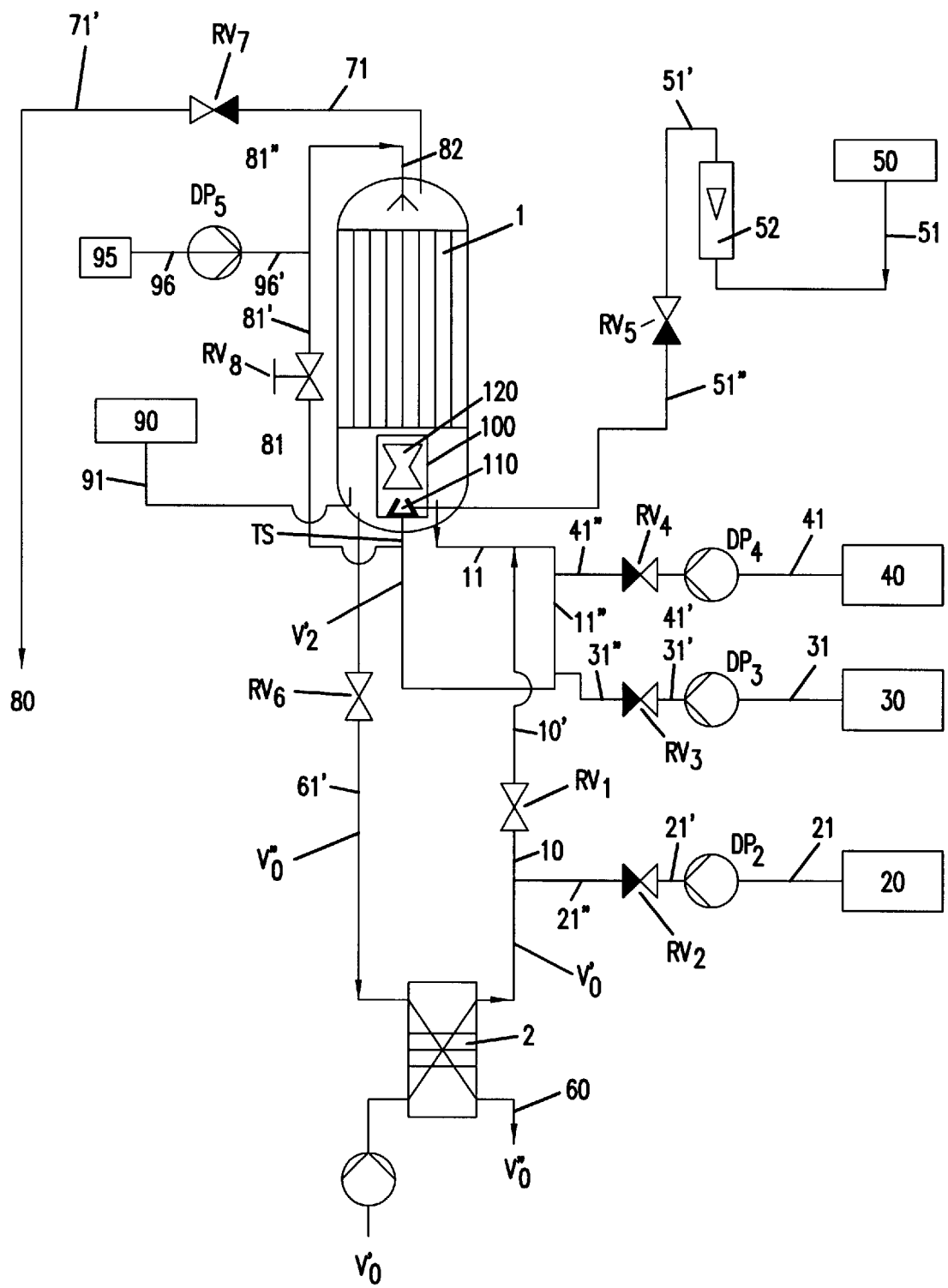
FIG. 2 Schematic representation of oxidation system

FIG. 2 shows the schematic representation of an oxidation system. The water flow contaminated with organic impurities $V'_0$ or the waste water flow, which has been preheated in a heat exchanger to a temperature difference of 5–200° C. relative to the reaction temperature, is fed via pipe 10, a control valve RV1, a pipe 10' to the reactor circulation flow $V'_2$, consisting of the pipe sections 11, 11' and 11" in the intake section of pump P1. Pipe 11 connects a discharge branch of a reactor 1 with the intake of pump P1, and pipe 11" the discharge branch of pump P1 with a nozzle system 100 which is arranged in the lower part of the reactor. The circulation flow recirculation ratio is 1:0 to 1:20.

Acid or alkaline 20 is fed into the system via an apportioning circuit with apportioning pump $DP_2$, apportioning valve $RV_2$ and pipes 21, 21' and 21" and discharges into pipe 10, thus feeding the acid or alkaline via a futher apportioning valve $RV_1$ and a pipe section 10' into the pipe section 11 which is part of the reactor circulation flow $V'_2$ and which conducts to the motive jet TS.

A radical starter 30 is fed into the system via an apportioning circuit with apportioning pump $DP_3$, apportioning valve $RV_3$ and pipes 31, 31' and 31" and discharges into pipe 11' which is part of the reactor circulation flow $V'_2$ and which conducts to the motive jet TS.

A catalyst 40 is fed into the system via an apportioning circuit with apportioning pump $DP_4$, apportioning valve $RV_4$ and pipes 41, 41' and 41" and discharges into pipe 11' which is part of the reactor circulation flow $V'_2$ and conducts to the motive jet TS.

The circulation pump P1 serves as a mixing device for the chemicals apportioned into the system, and also for the generation of a motive jet TS in connection with nozzle system 100 or a motive jet nozzle 110 located in the lower part of nozzle system 100.

An $O_2$-containing gas 50 is fed to the motive jet nozzle 110 via a flowmeter, 52, an apportioning valve $RV_5$ and pipes 51, 51' and 51" by means of gas nozzles arranged on the side in the low-pressure area of the motive jet. Based on the underpressure which is dependent on the velocity of the motive jet the gas flow can be of a magnitude of 10 times the volumetric flow of the water, the disperse phase always being formed by the $O_2$-containing gas.

The geometry, the characteristics and the function of the nozzle system will be dealt with at a later time. The outlet flow $V_0"$ out of the reactor passes via a control valve $RV_6$, the heat exchanger 2 and pipes 61 and 61'. The reactor is vented 80 via a control valve $RV_7$ and pipes 71 and 71'. A heater 90 supplies the reactor with the energy necessary for the starting conditions via pipe 91.

From pipe 11" part of the circulation flow is fed via control valve $RV_8$ and pipes 81, 81' and 81", which are also referred to as "shower pipes", to a spraying device 82 located in the upper part of the reactor and which is used, amongst other purposes, to combat foam. Additives 95 for microdispersion initialization and stabilization are also provided which are fed into the pipe 81" or the spraying device 82 via an apportioning pump $DP_5$ and pipes 96 and 96'.

The functioning of the system is dealt with in greater detail below. The reactor pressure range is around 2–10 bars, preferably approx. 3–4 bars. The temperature range is around 80–140° C., preferably approx. 110° C. Possible materials for the reactor are V4A steels in order for the pressure reactor safety requirements to be fulfilled in a simple and cost-effective manner with reference to various regulations such as the pressure vessel code.

Microdispersion stabilization is achieved by the addition of a low-foam surfactant or by a polyether mixture, e.g. a polyethylene/polypropylene oxide copolymeride. At the same time the bubble column height is kept as low as possible to facilitate degassing of the water. The infusion of the polyether can also be done into the reactor circulation flow.

The shower pipes 81, 81' and 81" are also supplied by the circulation pump P1, and the flow is regulated by valve RV₈. The gas mixture, which is low in oxygen, leaves the reactor via pipes 71 and 71' and control valve RV₇. If necessary, the heat-up energy required in the startup phase can be provided by an electrical heater installed in the reactor.

Figure 3A:
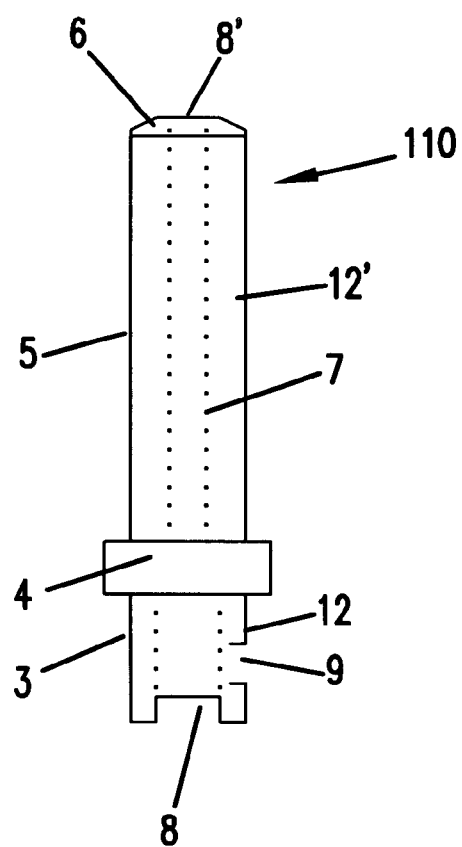
FIG. 3A Side view of first motive jet nozzle
Figure 3B:
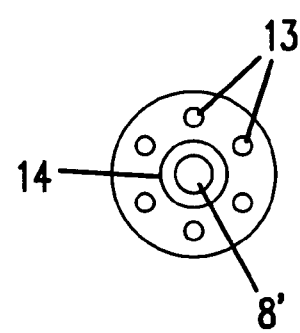
FIG. 3B Plan view of first motive jet nozzle

FIG. 3A and 3B show a schematic side- and plan-view representation of a first motive jet nozzle. In the simplest case the nozzle system which is responsible for the superimposition of radical chain reaction I and oxygen chain reaction III, as well as the associated high reaction efficiency, consists of a motive jet nozzle 110. The motive jet nozzle 110 is constructed rotationally symmetric and consists of a nozzle connection section 3, a fastening element 4 and a front nozzle section 5, at the end of which a nozzle head 6 is located. The nozzle connection section 3 has a cylindrical channel 7, at the one end 8 of which the motive jet is supplied. At the other end the channel 7 discharges into the fastening element 4, passes through it and, as cylindrical channel 7' with a slightly reduced cross section through the front nozzle section 5 and through the nozzle head 6 where the motive jet outlet opening 8' is located. On the side the nozzle connection section 3 has another opening 9 which serves for the infeeding of the O₂-containing gas which is fed to the nozzle head 6 in the chambers 12, 12' located outside the channel 7, 7'. The nozzle head 6 has 6 bores 13 which are arranged around the motive jet outlet opening 8'. The bores 13 are arranged symmetrically around the motive jet tube 14. The gas jet (air or air-oxygen mixture) is infused in a finely disperse form into the motive jet to ensure maximum oxygen transfer between the gas bubbles and the surrounding fluid. For the purpose of achieving high transfer efficiency a stable bubble column with a bubble diameter distribution of 1–100 μm is to be generated.

FIGS. 4A–4C show plan views of other examples of embodiments of a motive jet nozzle with various nozzle heads.

FIG. 4A shows nozzle head 6 with outlet opening 8', motive jet tube 14, and 4 bores 13 in the manner already described. Arranged between bores 13 are another 4 bores 13' through which the radical starter is infed into the motive jet. The bores 13 and 13' can be of the same or different sizes, depending on the pre-defined pressure conditions. Essential is that with this nozzle head, in addition to the O₂-containing gas, the radical starter is also supplied through the nozzle head. A wide spectrum of nozzle head configurations is naturally possible which is only insinuated by FIG. 4A.

FIG. 4B shows a nozzle head 6 with 5 slot-shaped bores or outlet openings for the O₂-containing gas or the radical starter. With such an arrangement the motive jet can be imparted a whirl by the O₂-containing gas or by the radical starter which has an advantageous effect with regard to the effectiveness of the mixing action.

FIG. 4C shows a nozzle head 6 with a rectangular cross section of the motive jet tube 6, thereby producing a slot-shaped nozzle. Here, the bores 13 or 13' are arranged around the rectangular opening, with one bore 13' coming after ever two bores 13.

Figure 5:
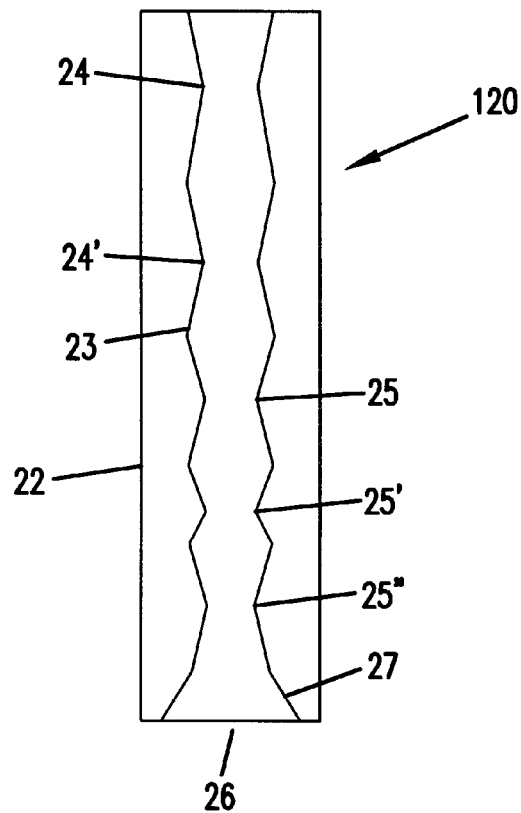

FIG. 5 shows a reaction nozzle which is arranged directly above the motive jet nozzle and is also part of the nozzle system. As a reaction nozzle 120 a rotationally symmetric multiple Laval nozzle (convergent/divergent nozzle) is preferably used. The latter is of rotationally symmetric design with a cylindrical outside shell 22. An inside tube 23 is constructed as a multiple Lavel nozzle with the constrictions 24, 24' and 25, 25' and 25". On the one end 26 the reaction nozzle has an inlet bevel 27 which serves for optimum inflowing of the reaction fluid or of the motive jet and the O₂-containing gas. Suitable materials are stainless steel or ceramic materials such as porcelain. The repetitive jet constrictions and expansions produce a flow tube cascade with unstationary flow conditions and cavitation phenomena which result in permanent air or oxygen in mixture. By an appropriate selection of the motive jet velocity and of the constriction or expansion radii, the system, excited up to cavitation, can accommodate 60–90% of the total reactor output. Depending on reactor output the constriction and expansion radii of the reactor nozzle are between 1 to about 50 mm.

The combination of a motive jet nozzle with a downstream reaction nozzle provides a two-stage nozzle concept. The nozzle system 100 shown in FIG. 2 is designed as a flow tube reactor and accommodates 50–90% of the reaction output, while the reactor vessel is operated with a recirculation ratio (infeed flow:return flow) of 1:0 to 1:20 in order to alternatively achieve 40–90% substrate degradation values. On the basis of the high transfer efficiencies achieved directly in the nozzle system, for the reactor normal V4A steels and for this range of applications low temperatures of 80–140° C. can be used. For special applications, e.g. in the presence of high chloride concentrations, coating of the reactor vessel is appropriate. In function of the reactor output the nozzle system 100 has a length of 150 to 5,000 mm.

Figure 6:
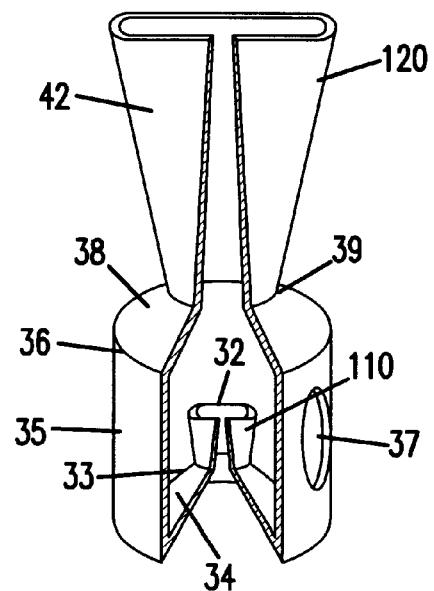
Figure 2:
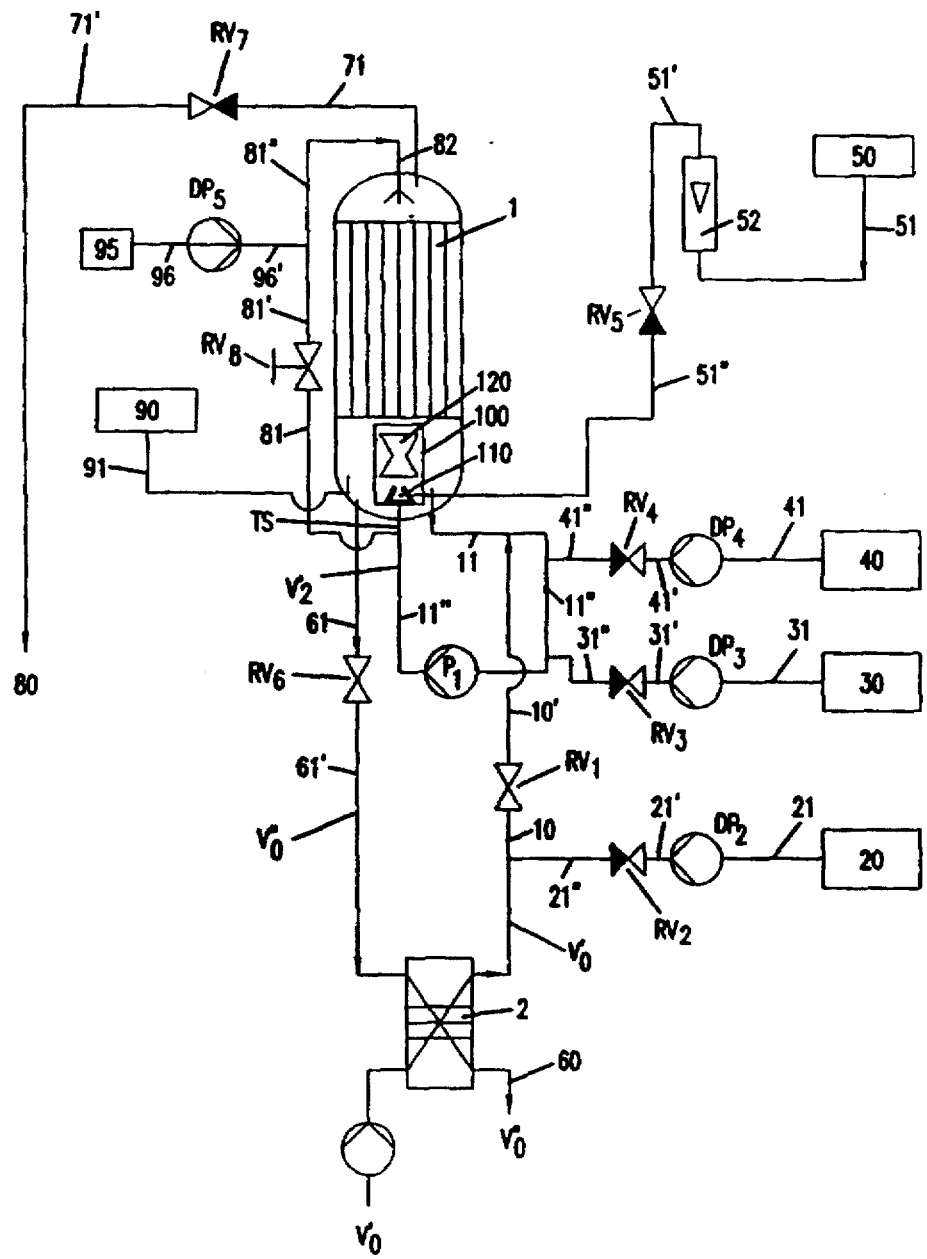
Figure 3A:
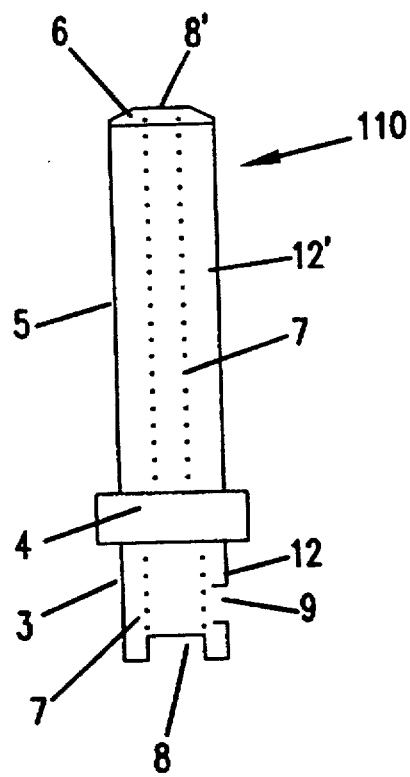
Figure 3B:
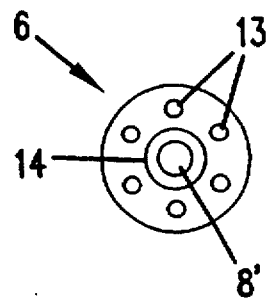

FIG. 6 shows an isometric representation (cutaway view) of a nozzle system with slot-shaped nozzles. A motive jet nozzle 110 has a slot-shaped cross section, at the upper end 32 of which the slot shape is clearly distinguishable. The lower part 33 of the conically lightly flaring motive jet nozzle is mounted on a conically shaped part 34. This conically shaped part 34 is in turn connected to a cylindrical part 35 which at the edge 36 forms the termination of the motive jet nozzle. Located on the one side of the cylindrical part 35 is an opening 37 which is provided for infeeding the O₂-containing gas. The O₂-containing gas is fed into the underpressure area of the motive jet through this opening. Mounted on the edge 36 is another conically flared part 38 which is a part of the reaction nozzle 120 and which transcends into a funnel-shaped nozzle section at the circular joint 39. The cross section of this nozzle section 42 continuously transposes over its entire length from a circular to a slot-shaped cross section. In this nozzle system the reaction nozzle is permanently connected with the motive jet nozzle.

Another possibility of generating unstationary flow conditions for the purpose of maximizing the mass transfer is provided by the use of an external excitation source, such as e.g. ultrasonic or vibration systems.

An essential function of the nozzle system as set forth in the present invention is the generation of unstationary flow conditions, in the aftermath of which cavitation phenomena occur.

The major advantages of the process described lies typically in the disposal of highly contaminated component flows. An optimally adjusted reaction chain is the compulsory precondition for a high transfer efficiency. The operating costs are below those of known processes (e.g. flocculation, flotation, LOPROX, FENTOX etc.). The use of common V4A steels solves the familiar problems of materials in this connection.

The process is distinguished by its flexibility for the treatment of waste water flows of varying types and concentrations. Advantages are also in particular the very low production of sludge, the high biocompatibility of the residual impurities and the low consumption of chemicals. The combination of these advantage with autothermal operation and the high efficiency yield a disposal process which is extraordinarily low in cost.

Example 1 describes a system with motive jet nozzle and a low chemical oxygen binding load which is caused by colored waste water.

A waste water flow contaminated with reactive and pigment colorants which has to be pretreated because of its coloration has a CSB value of 2,600 mg $O_2$/ltr. On the basis of the very good oxidizability of the waste water impurities and the requirement of achieving only decoloration, the oxidation is performed with the aid of a motive jet nozzle only. In this case 3.5 m$^3$/h of the waste water is fed via the circulation flow and the motive jet nozzle into the reactor with a rated capacity of 2,500 ltr. The filling capacity of the reactor is 880 ltr., the bubble column produced in the gassing reaching a volume of 1,400 ltr. The adjusted circulation flow of 12 m$^3$/h guarantees a recirculation ratio of 1:3 to 1:4. This means that on average each volumetric element fed into the reactor will pass through the motive jet nozzle three to four times and is consequently infused with oxygen three to four times. The waste water is oxygenated with air by the infusion of 45 Nm$^3$/h air in the underpressure area of the motive jet nozzle. The waste water supplied to the reactor is adjusted to a pH value of 3.0 and the infed 35% solution peroxide flow is 0.55 ltr./min. As a catalyst a mixture of ferrous and manganese sulfate (molar 2:1) is pumped into the circulation flow as a 15% solution. For improved dispersion stabilization of the air/water mixture 0.1 ltr./min of a 10% solution of an ethylene/propylene oxide derivative (Pluronic PE 6800, BASF) is added to the shower pipe and simultaneously also minimizes the formation of foam. On the basis of the relatively low chemical oxygen binding load of the incoming flow the reactor operation has to be augmented with an external supply of heat. The oxidation process operating conditions are 115° C. and 3.5 bars. The process conditions described result in complete decoloration and 32% reduction in the chemical oxygen binding load.

The advantage of this operating regime is the complete decoloration, as well as the good biocompatibility with only partial reduction of the chemical oxygen binding load of the waste water because in this case a contamination of up top 2,000 mg $O_2$/ltr. is permitted, insofar as the contaminants of the waste water sent to the sewage treatment plant are biocompatible. The biocompatibility is expressed as a $BSB_5$/CSB ratio and in this example achieves a value of 0.7. As a comparative substrate glucose exhibits a $BSB_5$/CSB ratio of approx. 0.8.

Example 2 describes a system with motive jet nozzle and a multiple Laval nozzle. A highly contaminated industrial waste water adjusted to pH 3.4 with a chemical oxygen binding load concentration of 8,000 mg $O_2$/ltr. is preheated in the heat exchanger by the reactor outflowing water to 110° C. and continuously pumped into the reactor circulation flow at a rate of 2,000 ltr/h. At the same time a 15% ferrous sulfate solution is added at a rate of 0.05 ltr./min and a 35% hydrogen peroxide solution at a rate of 0.3 ltr./min. The circulation pump pumps the waste water/chemical mixture into the motive jet nozzle at a rate of 12 m$^3$/h and a nozzle pilot pressure of 7 bar, the jet velocity in the nozzle outlet being 35 m/sec. An air flow of 45 m$^3$/h is infused into the motive jet via three gas tubes of a diameter of 2 mm integrated into the motive jet nozzle on the side and the gas fluid dispersion passed through the 450 mm long triple Laval nozzle. The reaction temperature is 120° C. and the reactor pressure 2.5 bars. The reduction of the chemical oxygen binding load achieved in connection with the waste water impurities (fiber avivages, emulsifiers and dispersants) and the described reaction conditions is 83%. The autothermal operation of the reactor, the use of small quantities of peroxide and the sludge-free 83% disposal result prove to be very advantageous and economical because the principal reaction products are $CO_2$ and water.

Example 3 describes a system with a motive jet nozzle and a cylindrical reactor nozzle, as well as with external excitation.

A waste water flow of 4.5 m$^3$/h adjusted to a pH value of 2.5 with a chemical oxygen binding load concentration of 5,500 mg $O_2$/ltr. which was caused by polysaccharides, reactive colorants and surfactants is preheated by the reactor outflowing water to 100° C. and pumped into the reactor circulation flow. The mean hydrodynamic dwell time under these operating conditions is 20 minutes. As radical starter a mixture consisting of 95% hydrogen peroxide (35%) and 5% azobisisobutyronitrile (AIBN) with an apportioning rate of 0.5 ltr./min. was added to the circulation flow. The catalyst apportioning, consisting of a 20% ferrous citrate complex, amounts to 0.06 ltr./min. and is also added to the circulation flow. For the stabilization of the microemulsion 0.02 ltr./min. of a 10% solution of an ethylene/propyleneoxide polymer is added in the nozzle area of the reactor. The oxygen is infused into the motive jet with a mixture of 50% air and 50% technical oxygen with a delivery rate of 60 m$^3$/h which is passed through the cylindrical reaction nozzle at a velocity of 45 m/sec. The reaction temperature is 110° C. at an adjusted reactor pressure of 3 bar. To ensure autothermal reactor operation the infed waste waster is preheated in a heat exchanger to 100° C. For the provision of unstationary flow conditions five ultrasonic heads each with a 300 W power output are installed in the circulation flow immediately before the nozzle system so that pressure waves are generated in the fluid which in the nozzle system result in cavitation phenomena, as a result of which an optimum mass transfer occurs between the gas and liquid phases.

The reduction in chemical oxygen binding load achieved with this operating regime is around 85%, the oxidation fraction resulting from the hydrogen peroxide being 20% and that from the oxygen being 65%.

Example 4 describes a system with a slot-shaped nozzle system and high chemical oxygen binding load value.

A highly contaminated industrial waste water flow with impurities of 40,000 mg $O_2$/ltr. from used oil wastes is adjusted to pH 2 and fed into the reactor at a rate of 2.3 m$^3$/h. The reaction temperature is 135°, the reactor influx being heated up by the outflowing, disposed waste water to 128° C. The waste water is pumped to a duplex slot-shaped nozzle with the circulation pump. The slot-shaped nozzle dimensions are 11 mm×2.5 mm (motive jet nozzle), or 18 mm×1.6 mm (reaction nozzle), three such duplex nozzle systems being installed. The oxygen-containing gas is infused in the underpressure area of the motive jet nozzle and mixed with the motive jet. Due to the reaction nozzle unstationary pressure conditions occur within the nozzle chamber, causing the fluid to cavitate so that an intensive exchange of oxygen is assured. The amount of peroxide added to the reactor inlet flow is 25% relative to the 40,000 mg $O_2$/ltr., and that of the catalyst 0.004 mol/ltr. As a catalyst a 15% by weight ferrous sulfate solution is used. The air flow required for the oxidation is 80 $Nm^3$/h. By the adjustment of a mean dwell time of 40 min. and a return flow ratio of 1:5 a 82% reduction in chemical oxygen binding load is achieved. On the basis of the efficient transfer of oxygen and the high chemical oxygen binding load concentration autothermal reactor operation with 60% oxygen oxidation can be assured at a total degradation of 85%.

What is claimed is:

1. Process for the continuous operation of a system for the treatment of organically contaminated waste water in a reactor with an upstream heat exchanger and at least one nozzle system by the addition of a radical starter, a catalyst and an $O_2$-containing gas, the process comprising steps of:

preheating the waste water in a heat exchanger;

injecting the waste water through the nozzle system that comprises a motive jet nozzle into the reactor as a motive jet (TS), adding a radical starter and a catalyst to a reactor circulation flow with an intake pump thus conducting them to the motive jet, adding an $O_2$-containing gas to the motive jet, thereby producing an unstationary flow and starting and maintaining a radical chain reaction, wherein in this chain reaction a superimposition of the radical chain reaction initiated by the radical starter and of the $O_2$ chain reaction initiated by the $O_2$-containing gas occurs, as a result of which the catalyst cyclically changes its valence and wherein the degradation of the waste water organic contaminants to be oxidized is thereby effected.

2. The process of claim 1, wherein more than one nozzle systems are integrated in the reactor and are connected with one another by means of central supply lines for fluids and the $O_2$-containing gas.

3. The process of claim 1, wherein the unstationary flow is caused by pulsating compression of the fluid and gas components and the unstationary flow creates a cavitation effect.

4. The process of claim 1, wherein the $O_2$-containing gas is added in a volumetric flow ratio of 1:1 to 10:1 to the motive jet as one or more of air, an oxygen/air mixture or pure oxygen.

5. The process of claim 1, wherein due to the oxygen of the $O_2$-containing gas an oxidation fraction of 50% to 500% of a peroxide fraction is achieved.

6. The process of claim 1, wherein transition metal ions in concentration of 0.001–0.1 mol/ltr. are used as catalysts and oxygen radical forming compounds of the peroxide group in concentrations of 0.1–40% related to a chemical oxygen demand of impurities in the waste water to be oxidized are used as radical starters.

7. The process of claim 1, wherein chemicals for pH control are added to the reactor circulation flow where said chemicals are conducted to the motive jet, and means for the initiation and stabilization of the microdispersion initiation and stabilization are added, the means being used being polyethers or surfactants in concentrations of from 0.001 to 0.1 g/ltr.

8. The process of claim 1, wherein the operating temperature of the reactor is about 80–140° C.

9. The process of claim 1, wherein the nozzle pressure is around 5–12 bars and the motive jet velocity is around 10–80 m/sec.

10. A system for performing the process of claim 1, the system comprising a reactor with upstream heat exchanger with inlets and outlets for the waste water, a supply of heat and an air exhaust line, with metering equipment for each of the radical starter, the catalyst, an acid or alkaline and the $O_2$-containing gas, and a nozzle system, wherein a lower part of the reactor has at least one nozzle system which is connected with a waste water supply system and wherein a pipe is provided which connects a waste water inlet via a valve $RV_8$ with an upper part of the reactor and which is provided for the addition of substances for initiating and stabilizing a microdispersion.

11. The system of claim 10, wherein the reactor is constructed as a loop reactor or a tube bundle reactor.

12. The system of claim 10, wherein the nozzle system is equipped with a motive jet nozzle in which a first inner channel is provided for the waste water and in which a plurality of nozzles for the infeed of the $O_2$-containing gas are arranged in an underpressure area of the motive jet nozzle.

13. The system of claim 12, wherein the plurality of nozzles comprises at least 3 gas nozzles, each with an inside diameter of 0.2–5 mm, or an annular nozzle which is positioned into compartments is provided.

14. The system of claim 12, wherein the motive jet nozzle has an inside diameter of 2–20 mm.

15. The system of claim 12, wherein a reaction nozzle which is provided for initiating unstable flow behavior is arranged downstream of the motive nozzle jet.

16. The system of claim 15, wherein the reaction nozzle is constructed as a single Laval nozzle or a multiple Laval nozzle.

17. The system of claim 15, wherein the motive jet nozzle and/or the reaction nozzle is constructed as a slot-shaped nozzle with rectangular cross section.

18. Process for the continuous operation of a system for the treatment of organically contaminated waste water in a reactor with an upstream heat exchanger and at least one nozzle system by the addition of a radical starter, a catalyst and an $O_2$-containing gas, the process comprising steps of:

preheating the waste water in a heat exchanger, injecting the waste water through the nozzle system that comprises a motive jet nozzle into the reactor as a motive jet, adding a catalyst to a reactor circulation flow with an intake pump thus conducting them to the motive jet, adding an $O_2$-containing gas and a radical starter to the motive jet, thereby producing an unstationary flow and starting and maintaining a radical chain reaction, wherein in this chain reaction a superimposition of the radical chain reaction initiated by the radical starter and of the $O_2$ chain reaction initiated by the $O_2$-containing gas occurs, as a result of which the catalyst cyclically changes its valence and wherein the degradation of the waste water organic contaminants to be oxidized is thereby effected.

19. The system of claim 18, wherein the nozzle system is equipped with a motive jet nozzle in which a first inner channel is provided for the waste water and in which a plurality of nozzles for the infeed of the $O_2$-containing gas and the radical starter are arranged in an under-pressure area of the motive jet nozzle.

20. The system of claim 19, wherein the plurality of nozzles comprises at least 3 gas nozzles with an inside diameter of 0.2–5 mm or an annular nozzle which is positioned into compartments.

21. The process of claim 18, wherein more than one nozzle systems are integrated in a reactor and are connected with one another by means of central supply lines for fluids and the $O_2$-containing gas.

22. The process of claim 18, wherein the unstationary flow is caused by pulsating compression of the fluid and gas components and the unstationary flow creates a cavitation effect.

23. The process of claim 18, wherein the $O_2$-containing gas is added in a volumetric flow ratio of 1:1 to 10:1 to the motive jet as one or more of air, an oxygen/air mixture or pure oxygen.

24. The process of claim 18, wherein due to the oxygen of the $O_2$-containing gas an oxidation fraction of 50% to 500% of a peroxide fraction is achieved.

25. The process of claim 18, wherein transition metal ions in concentration of 0.001–01 mol/ltr. are used as catalysts and oxygen radical forming compounds of the peroxide group are used in concentrations of 0.1–40% related to a chemical oxygen demand of impurities in the waste water to be oxidized as radical starters.

26. The process of claim 18, wherein chemicals for the control of the pH value are added to the reactor circulation flow where said chemicals are conducted to the motive jet and means for the initiation and stabilization of microdispersion initiation and stabilization are added, the means being used being polyethers or surfactants in concentrations of from 0.001 to 0.1 g/ltr.

27. The process of claim 18, wherein the operating temperature of the reactor is about 80–140° C.

28. The process of claim 18, wherein the nozzle pressure is around 5–12 bars and the motive jet velocity around 10–80 m/sec.

* * * * *

UNITED STATES PATENT AND TRADEMARK OFFICE
CERTIFICATE OF CORRECTION

PATENT NO. : 6,139,755
DATED : October 31, 2000
INVENTOR(S) : Marte et al.

It is certified that error appears in the above-identified patent and that said Letters Patent is hereby corrected as shown below:

<u>Title page,</u>
Item [54], title, should read -- OXIDATION PROCESS, NOZZLE SYSTEM AND WASTE WATER TREATMENT SYSTEM --

<u>Column 1,</u>
Line 50, "seagents" should read -- Reagent --

<u>Column 3,</u>
Line 26, "11" should read -- II --

<u>Column 4,</u>
Line 7, "5-200°C" should read -- 5-20°C --

<u>Column 6,</u>
Line 2, "ever" should read -- every --

<u>Drawings,</u>
Sheet 2 of 5, Lead lines for reference numerals 41', 81 and 81" have been added to Fig. 2. Reference numerals 11" and 61 and line have been added to Fig. 2. The pump $P_1$ has been added to Fig. 2.
Sheet 3 of 5, Reference numeral 7 and lead line has been added to Fig. 3A. Reference numeral 6 and arrow line have been added to Fig. 3B.

Signed and Sealed this

Twenty-third Day of April, 2002

*Attest:*

*Attesting Officer*

JAMES E. ROGAN
*Director of the United States Patent and Trademark Office*